US012633684B2

(12) United States Patent
Anekawa

(10) Patent No.: US 12,633,684 B2

(45) Date of Patent: May 19, 2026

(54) CONNECTOR DEVICE

(71) Applicant: FANUC CORPORATION, Yamanashi (JP)

(72) Inventor: Tetsuro Anekawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 315 days.

(21) Appl. No.: 18/559,701

(22) PCT Filed: Jul. 19, 2021

(86) PCT No.: PCT/JP2021/026975

§ 371 (c)(1),
(2) Date: Nov. 8, 2023

(87) PCT Pub. No.: WO2023/002530

PCT Pub. Date: Jan. 26, 2023

(65) Prior Publication Data

US 2024/0243489 A1 Jul. 18, 2024

(51) Int. Cl.

*H01R 4/48* (2006.01)
*H01R 13/502* (2006.01)
*H01R 13/629* (2006.01)

(52) U.S. Cl.

CPC ............. *H01R 4/48* (2013.01); *H01R 13/502* (2013.01); *H01R 13/629* (2013.01)

(58) Field of Classification Search

CPC ....... H01R 4/48; H01R 13/502; H01R 13/629

(Continued)

(56) References Cited

U.S. PATENT DOCUMENTS 5,832,161 A * 11/1998 Pouyez ................ G02B 6/3885 385/59
6,089,902 A 7/2000 Daoud (Continued)

FOREIGN PATENT DOCUMENTS

JP H08-130080 A 5/1996
JP 2010-262854 A 11/2010

(Continued)

OTHER PUBLICATIONS

International Search Report issued in PCT/JP2021/026975; mailed Oct. 12, 2021.

*Primary Examiner* — Gary F Paumen

(74) *Attorney, Agent, or Firm* — Studebaker Brackett PLLC

(57) ABSTRACT

Provided is a connector device in which even a flexible wiring member can easily connect to a connector and in which an improvement in workability can be achieved. The present invention comprises a wiring member and a connector, wherein: the wiring member has a wire-shaped electric wire part and a terminal part which serves as a to-be-engaged part disposed at the tip end side of the electric wire part; the connector has an electrode part with which the terminal part engages in an insertable/removable manner, a housing which includes an accommodation part accommodating the electrode part, and a connection guide part which is provided to the housing; and, in a state in which the terminal part is disposed on an entrance/exit port side of the housing, the electric wire part is disposed at a draw-out port side of the housing, and a drawn-out part of the electric wire part, which is drawn out from the housing, has been formed, the connection guide part makes it possible for the terminal part to be introduced to and engage with the electrode part (Continued)

from the entrance/exit port by pulling the drawn-out part in the direction opposite the terminal part.

7 Claims, 16 Drawing Sheets

(58) Field of Classification Search
USPC .......................................... 439/296, 346, 350
See application file for complete search history.

(56) References Cited

U.S. PATENT DOCUMENTS

| | | | | |
|---|---|---|---|---|
| 6,398,579 | B1 * | 6/2002 | Banas | H01R 13/6273 439/372 |
| 2001/0024900 | A1 * | 9/2001 | Miwa | H01R 13/5219 439/350 |

FOREIGN PATENT DOCUMENTS

| | | | |
|---|---|---|---|
| JP | 2010-283990 | A | 12/2010 |
| JP | 2018-056076 | A | 4/2018 |
| JP | 2018-181607 | A | 11/2018 |

* cited by examiner

CONNECTOR DEVICE

TECHNICAL FIELD

The present invention relates to a connector device.

BACKGROUND ART

Conventionally, wiring members have been wired to various devices through connecting members such as connectors. A known structure for connecting a wiring member to a connecting member involves squeezing the tip of the wiring member between a leaf spring and a terminal to maintain the connected state, while pulling out the wiring member by deforming the leaf spring to separate from the terminal with a tool such as a minus screwdriver (see, for example, Patent Document 1).

CITATION LIST

Patent Document

Patent Document 1: Japanese Unexamined Patent Application, Publication No. 2018-056076

DISCLOSURE OF THE INVENTION

Problems to be Solved by the Invention

In the structure for connection by squeezing the wiring member between the leaf spring and the terminal, when the wiring member is flexible without rigidity, the wiring member deforms and is less squeezable, resulting in poor workability.

Means for Solving the Problems

A connector device according to one aspect of the present disclosure includes: a wiring member; and a connector detachably connected to the wiring member, in which the wiring member includes: a linear wire part; and a terminal part as an engaged part arranged at a tip end of the wire part, the connector includes: an electrode part, with which the terminal part is removably engaged; a housing including a housing part that houses the electrode part; and a connection guide part provided in the housing, the housing includes: an entrance/exit for the terminal part to the electrode part housed in the housing part; and a pull-out port, through which the wire part is pulled out from the housing part to an outside of the housing, and the connection guide part allows the terminal part to be arranged on a side of the entrance/exit, allows the wire part to be arranged on a side of the pull-out port, allows the pull-out part of the wire part to exist in a state of extending from the housing, and allows the terminal part to be introduced and engaged from the entrance/exit to the electrode part by pulling the pull-out part in a direction opposite to the terminal part.

Effects of the Invention

According to one embodiment, even a flexible wiring member can be easily connected to a connector, which can improve the workability.

PREFERRED MODE FOR CARRYING OUT THE INVENTION

Hereinafter, an embodiment of the present disclosure is described using drawings. In this specification, the term "approximately" does not strictly specify states, sizes, directions, orientations, shapes, etc., but includes conditions that approximate within a range capable of achieving their functions and effects.

Figure 1:
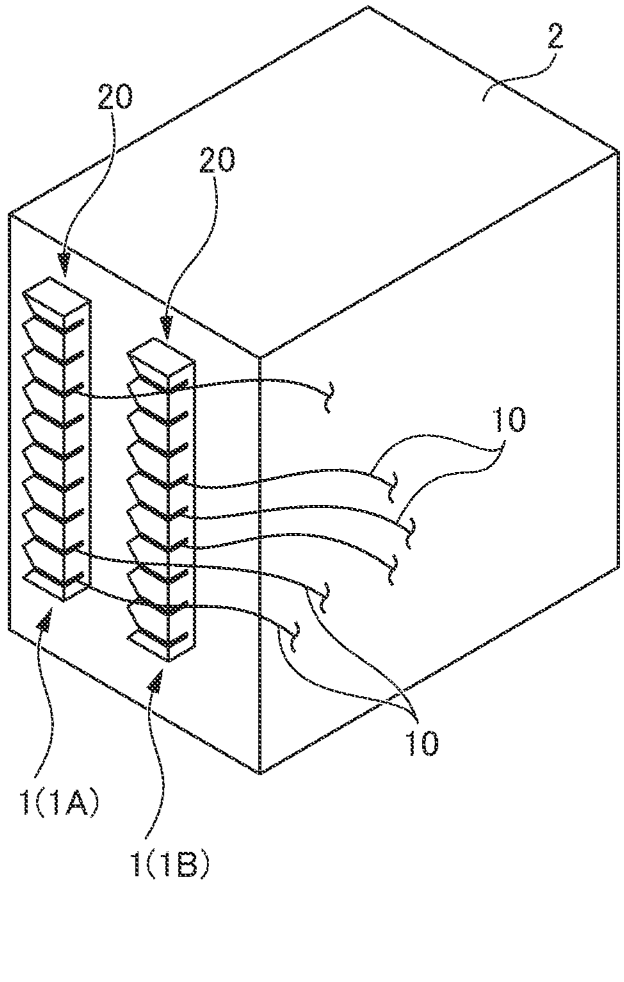
FIG. 1 is a perspective view illustrating a connector device according to an embodiment of the present disclosure, and a control device to which the connector device is connected.

FIG. 1 illustrates a connector device 1 according to the embodiment, and a control device 2 as a device to which the connector device 1 is connected. The control device 2 is electrically connected to a predetermined external device (not illustrated) via the connector device 1. Examples of the external device may include a CNC (computerized numerical control) device, a control panel for operating the CNC device, etc.

The connector device 1 is distinguished between an input side connector device 1A that transmits an input signal from the external device to the control device 2, and an output side connector device 1B that transmits an output signal from the control device 2 to the external device. The input side connector device 1A and the output side connector device 1B have substantially the same configuration. Therefore, in the following description, the input side connector device 1A and the output side connector device 1B are simply described as the connector device 1 without distinguishing therebetween.

The connector device 1 includes a wiring member 10 and a connector 20 to which the wiring member 10 is detachably connected. The connector 20 is detachably mounted to the control device 2.

Figure 2:
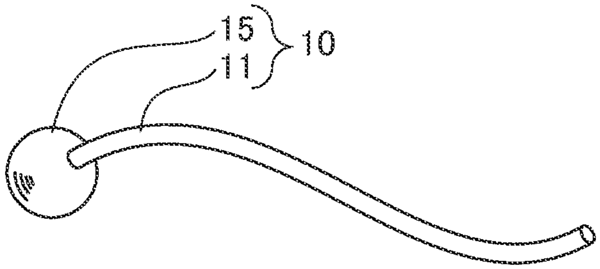
FIG. 2 is a perspective view of a wiring member according to the embodiment of the present disclosure.
Figure 3:
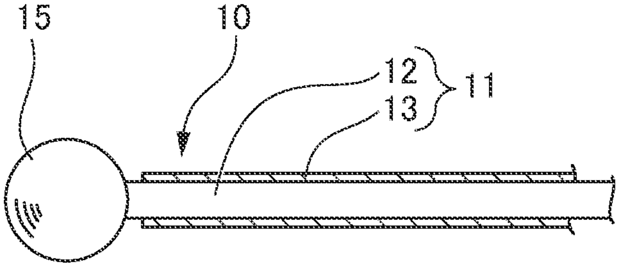
FIG. 3 is a partial sectional side view of the wiring member according to the embodiment of the present disclosure.

As illustrated in FIGS. 2 and 3, the wiring member 10 includes a flexible linear wire part 11 and a terminal part 15 as an engaged part arranged at the tip side of the wire part 11. The tip of the wire part 11 may extend beyond the terminal part 15. As illustrated in FIG. 3, the wire part 11 includes a metal conductor wire 12 and an insulating cover 13 that covers the conductor wire.

The terminal part 15 is arranged at one end of the conductor wire 12 and is electrically connected to the conductor wire 12. The terminal part 15 has electrical conductivity. The terminal part 15 is a nodular portion larger than the outer diameter of the entire wire part 11, and has a size approximately 2 to 10 times the outer diameter of the wire part 11, for example. The terminal part 15 is, for example, formed integrally with the conductor wire 12 by processing the conductor wire 12 into a nodular shape. The terminal part 15 may also be provided by welding a chip-like mass of a separate member composed of an electrically conductive material to the tip side of the conductor wire 12. The terminal part 15 of the embodiment is approximately spherical. The terminal part 15 may have a shape that protrudes from the center of the wire part 11 to both sides in at least one radial direction, and may be rectangular, collar-shaped, plate-shaped, etc.

Figure 4:
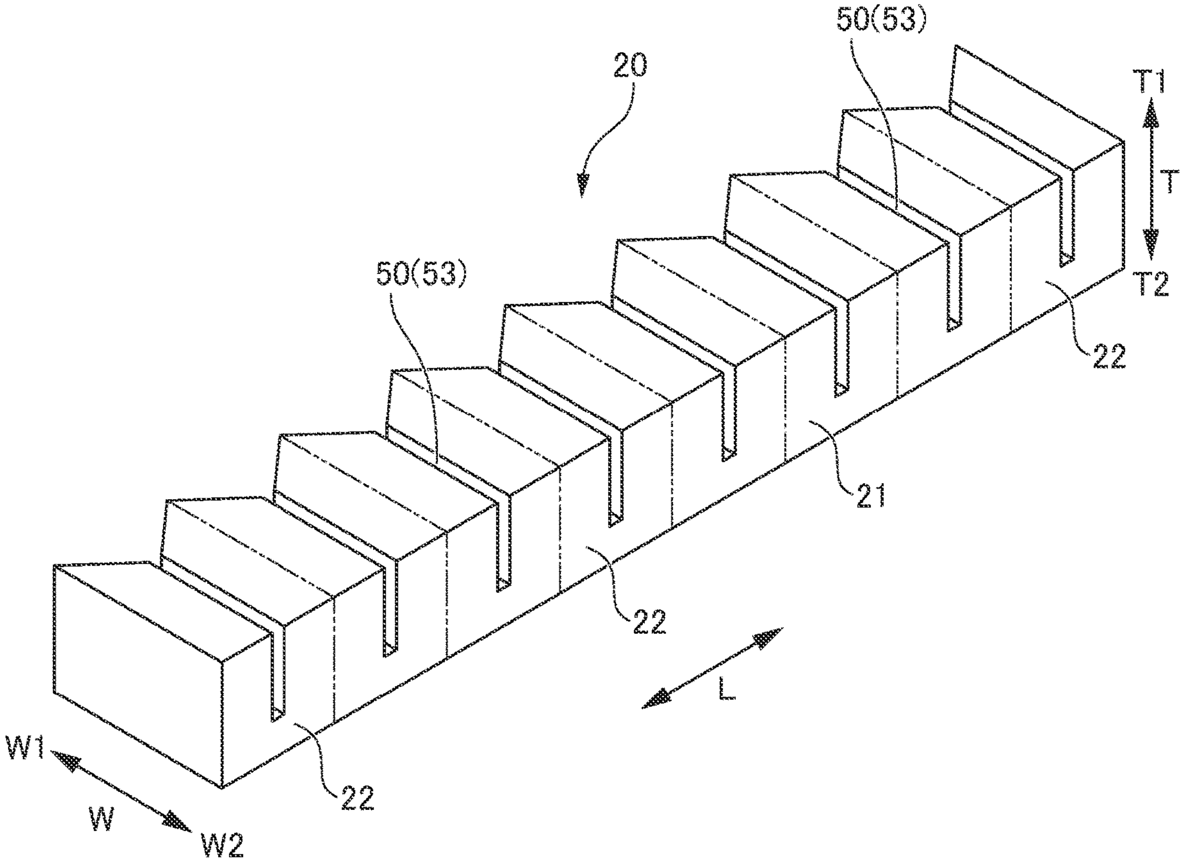
FIG. 4 is a perspective view of the connector according to the embodiment of the present disclosure.
Figure 5:
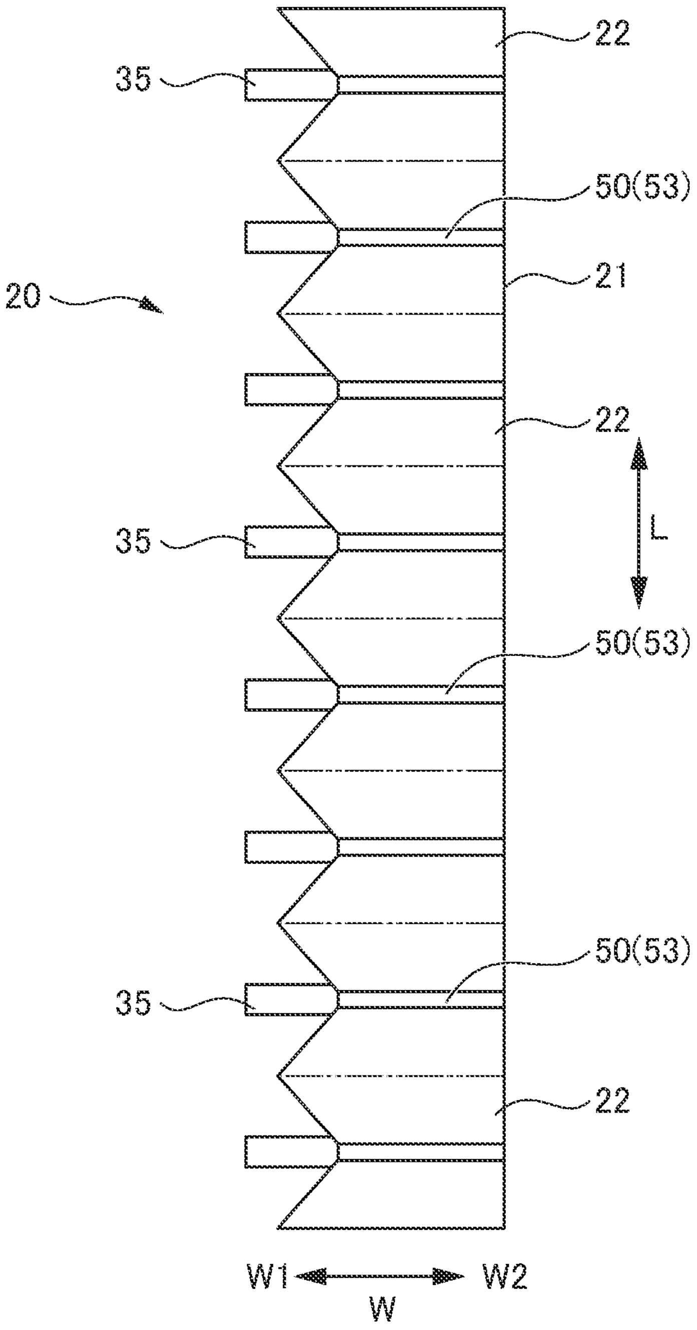
FIG. 5 is a plan view of the connector according to the embodiment of the present disclosure.

As illustrated in FIGS. 4 and 5, the connector 20 has a housing 21, which serves as a volumetric main body. The housing 21 is a resin block having an elongated rectangular shape. In FIGS. 4 and 5, arrows L, W, and T indicate the length direction, width direction, and height direction of the housing 21 and the connector 20, respectively. The same applies to all the drawings from FIG. 6 onwards. In the following description, the length (L) direction, width (W) direction, and height (T) direction each refer to the directions indicated by the arrows L, W, and T, respectively. Among the width (W) directions, the direction of an entrance/exit 27 of the housing 21 is referred to as the first width direction W1, and the direction of a pull-out port 28 as the second width direction W2. Among the height (T) directions, the direction in which a connection guide part 50 opens is referred to as the upward direction T1, and the direction in which the connection guide part 50 does not open is referred to as the downward direction T2. The designation of each direction of the housing 21 is for convenience in the description of the embodiment.

The housing 21 has a plurality of connecting parts 22 to which a single wiring member 10 is connected. Each connecting part 22 is a portion of the housing 21, and the plurality of connecting parts 22 are arranged in parallel in the length (L) direction. The dashed lines in FIGS. 4 and 5 indicate the hypothetical boundaries between two adjacent connecting parts 22. There may be gaps between adjacent connecting parts 22. In this case, for example, the plurality of connecting parts 22 are arranged on a plate-like base with intervals therebetween, to configure the housing 21. The illustrated housing 21 has eight connecting parts 22 arranged in parallel as a unit, but the number of connecting parts 22 is not limited to this.

Figure 6:
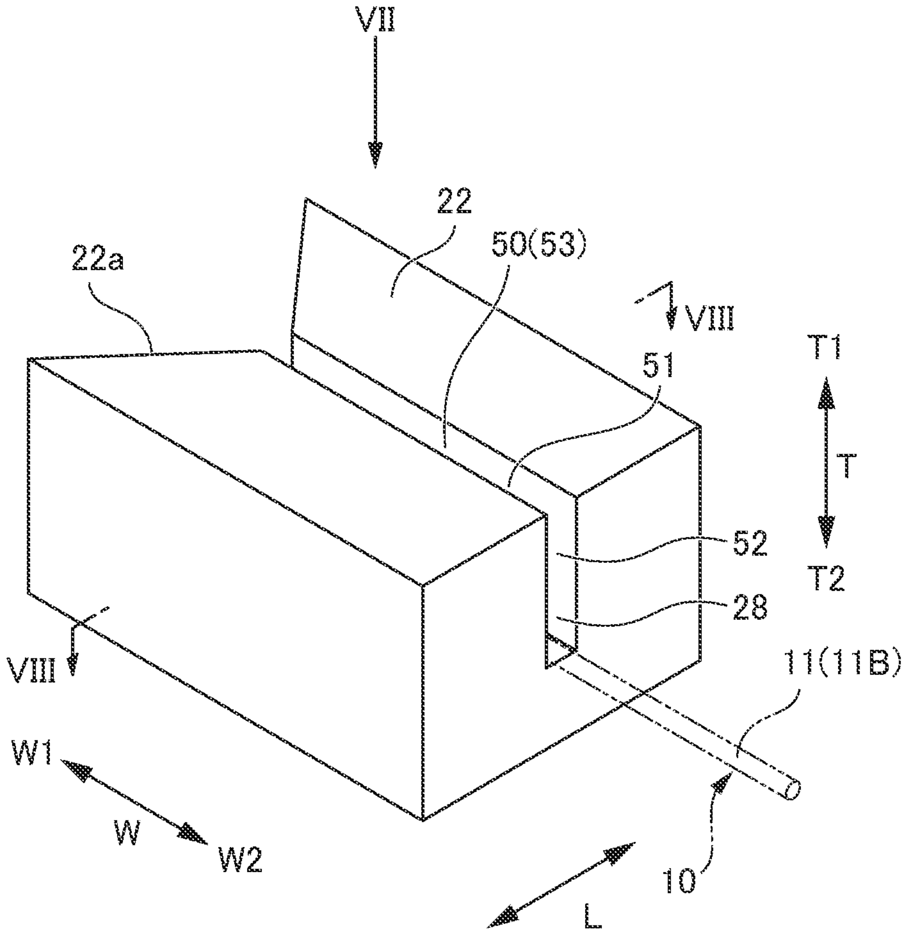
FIG. 6 is a perspective view of a connecting part configuring a portion of the connector according to the embodiment of the present disclosure.
Figure 7:
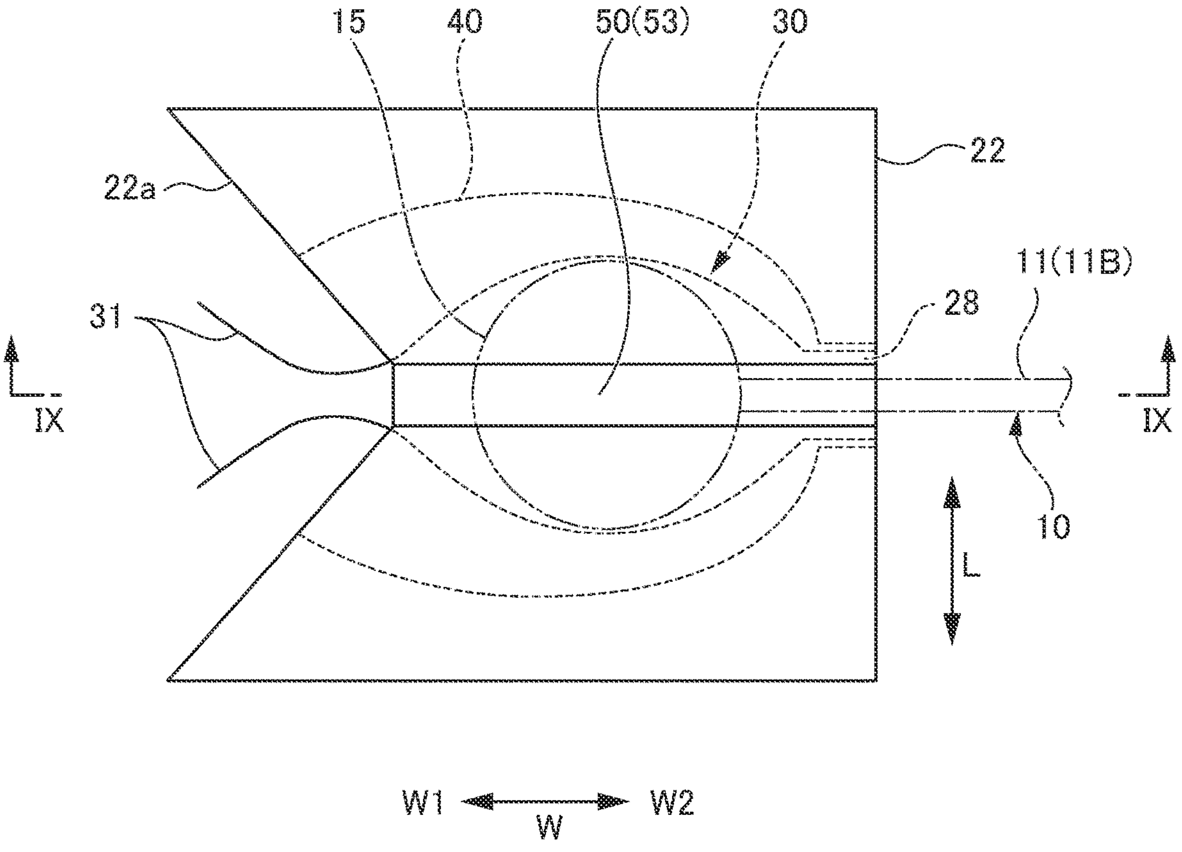
FIG. 7 is a plan view of the connecting part.
Figure 8:
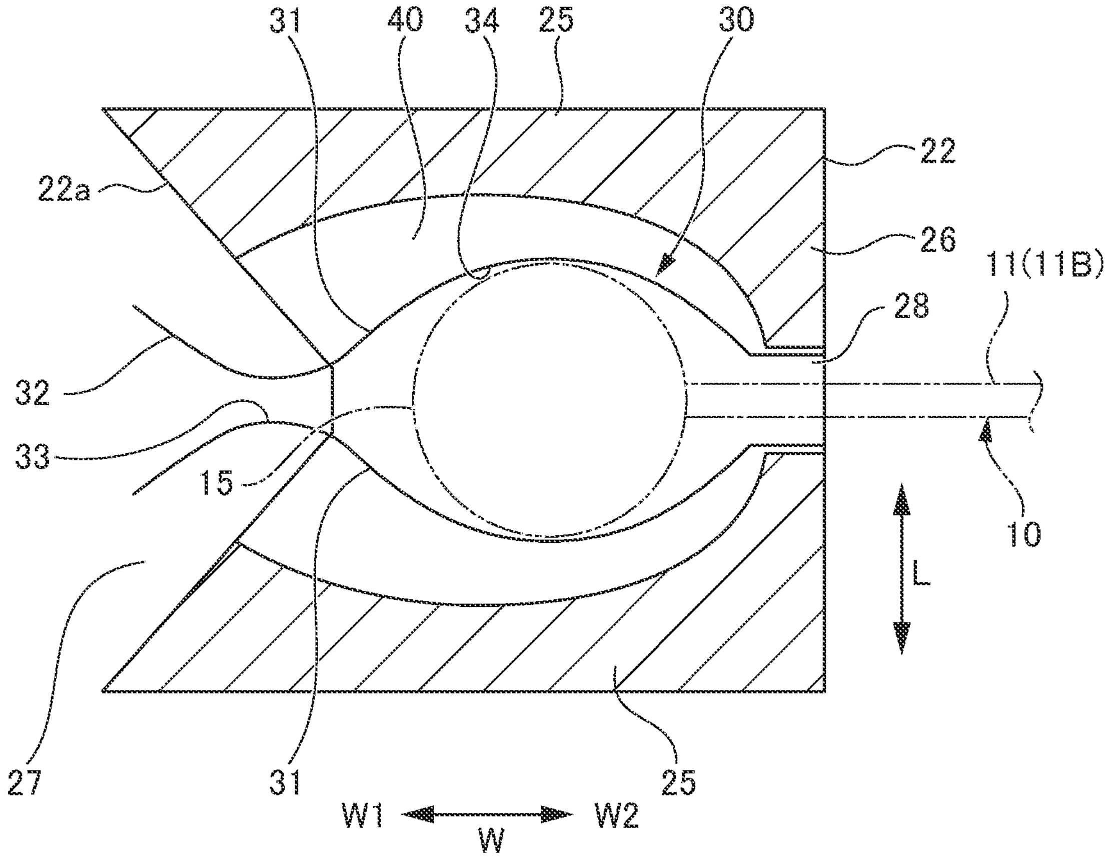
FIG. 8 is a sectional view taken along the line VIII-VIII in FIG. 6.
Figure 9:
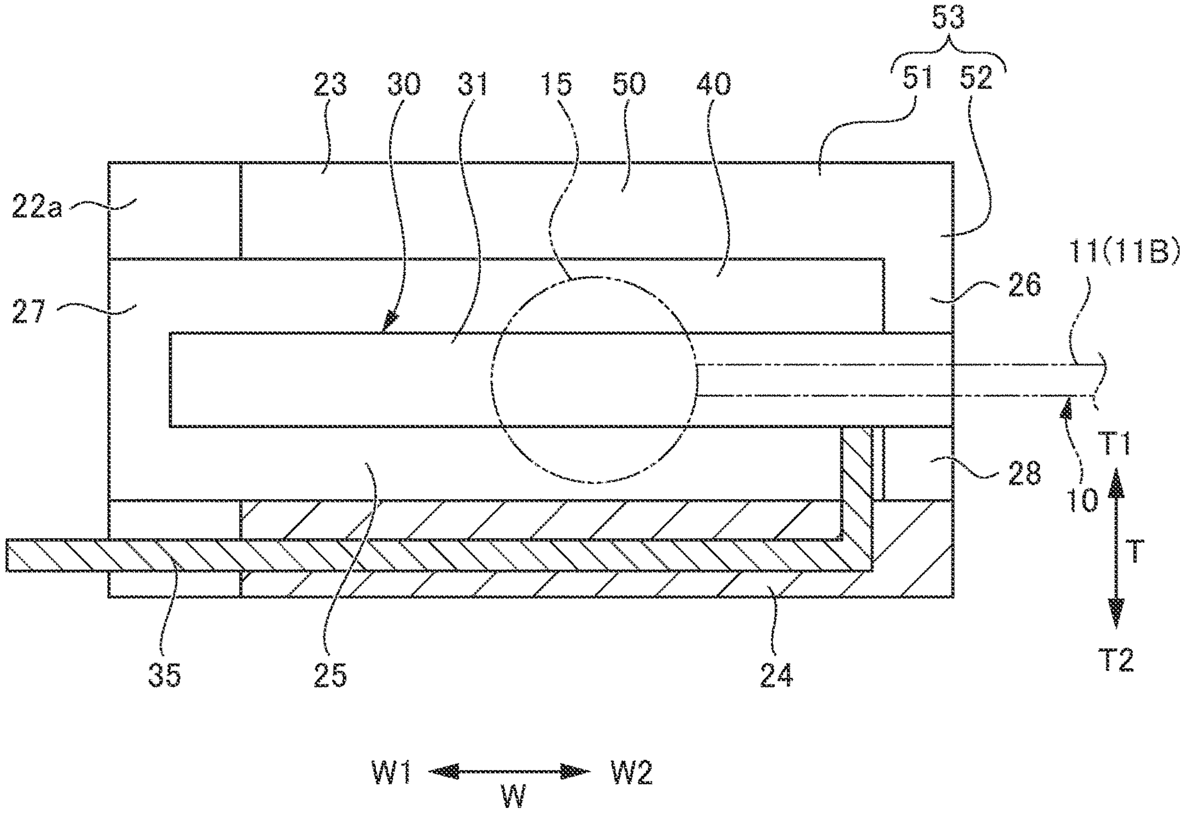
FIG. 9 is a sectional view taken along the line IX-IX in FIG. 7.

FIGS. 6 to 9 illustrate one connecting part 22. FIG. 6 is a perspective view of the connecting part 22; FIG. 7 is a plan view of the connecting part 22 (view along the arrow VII in FIG. 6); FIG. 8 is a sectional view along the line VIII-VIII in FIG. 6; and FIG. 9 is a sectional view along the line IX-IX in FIG. 7.

The connecting part 22 has a notch part 22*a* on the side in the first width direction W1 of the housing 21. The notch part 22*a* is a depression that forms two sides of a triangular shape when viewed in the height (T) direction. As illustrated in FIGS. 7 to 9, the connecting part 22 has an electrode part 30 that is removably engaged with the terminal part 15 of the wiring member 10, a housing part 40 that houses the electrode part 30, and the connection guide part 50.

As illustrated in FIGS. 7 to 9, the housing part 40 is formed inside the connecting part 22. The housing part 40 is a space surrounded by a top plate part 23, a bottom plate part 24, a pair of side plate parts 25, and a back plate part 26, which are included in the connecting part 22. The top plate part 23 and the bottom plate part 24 face each other with a distance in the height (T) direction. The pair of side plate parts 25 face each other with a distance in the length (L) direction. The back plate part 26 is arranged at the end on the side of the second width direction W2 (the right side in FIG. 8) of the housing part 40.

As illustrated in FIG. 8, the housing part 40 has an approximately elliptical shape when viewed in a plan view (when viewed in the direction of the arrow VII in FIG. 6). The connecting part 22 has the entrance/exit 27 on the side of the notch part 22*a* (the side in the first width direction W1) to the housing part 40, and has a pull-out port 28 on the side opposite to the entrance/exit 27 in the width (W) direction (the side in the second width direction W2). The entrance/exit 27 is an opening through which the terminal part 15 of the wiring member 10 enters and exits with respect to the electrode part 30 housed in the housing part 40. As illustrated in FIG. 8, the inner surfaces of the ends of the pair of side plate parts 25 form the entrance/exit 27, and are formed in a taper shape in which the cross-sectional opening area widens as distancing away from the housing part 40 toward the side in the first width direction W1, due to the notch part 22*a*. The pull-out port 28 is formed in the back plate part 26. The pull-out port 28 is an opening through which the wire part 11 is pulled out from the housing part 40 to the outside of the housing 21 (to the side in the second width direction W2), as described later.

As illustrated in FIG. 8, the electrode part 30 includes a pair of leaf springs 31 arranged at a distance from each other and facing each other in the length (L) direction as spring electrodes. The leaf spring 31 is an electrically conductive metal plate having elasticity. The electrode part 30 includes an opening part 32, a narrow part 33, and an engaging part 34 from the side of the entrance/exit 27 to the side of the pull-out port 28 of the connecting part 22. The end on the engaging part 34 side (the side in the second width direction W2) of each of the pair of leaf springs 31 is fixed to the housing 21. The terminal part 15 of the wiring member 10 can be arranged between the pair of leaf springs 31.

The opening part 32 opens such that the pair of leaf springs 31 gradually separate from each other in a direction from the narrow part 33 toward the entrance/exit 27 side (toward the side of the first width direction W1). The opening part 32 is a portion where the terminal part 15 is introduced into the housing part 40. The narrow part 33 is a portion where the pair of leaf springs 31 are in close proximity to each other, and the terminal part 15 is held in the engaging part 34. The engaging part 34 is a portion that is formed approximately elliptically by the pair of leaf springs 31 bulging in the length (L) direction, and the terminal part 15 is held inside. In the engaging part 34, the pair of leaf springs 31 elastically contact and electrically connect to the terminal part 15.

Figure 10A:
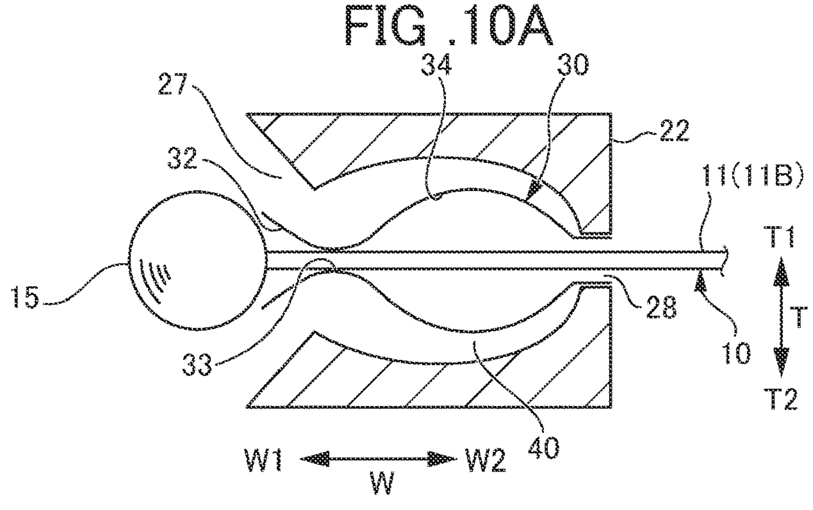
FIG. 10A is a plan view illustrating a first stage of an operation in which the wiring member according to the embodiment of the present disclosure is connected to an electrode part of the connector.
Figure 10B:
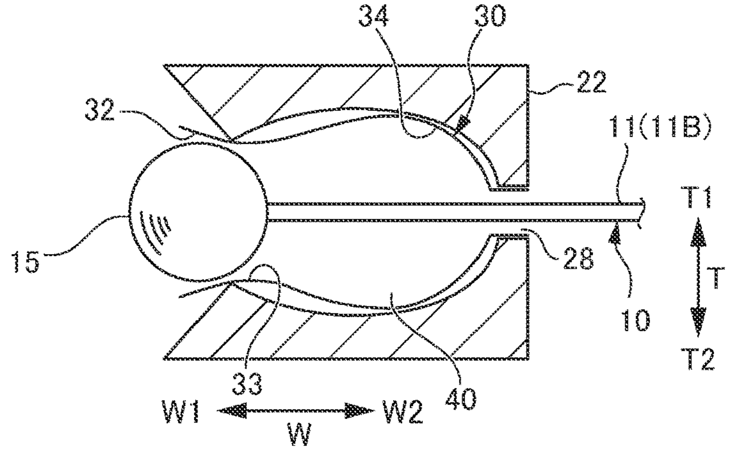
FIG. 10B is a plan view illustrating a second stage of the operation in which the wiring member according to the embodiment of the present disclosure is connected to the electrode part of the connector.
Figure 10C:
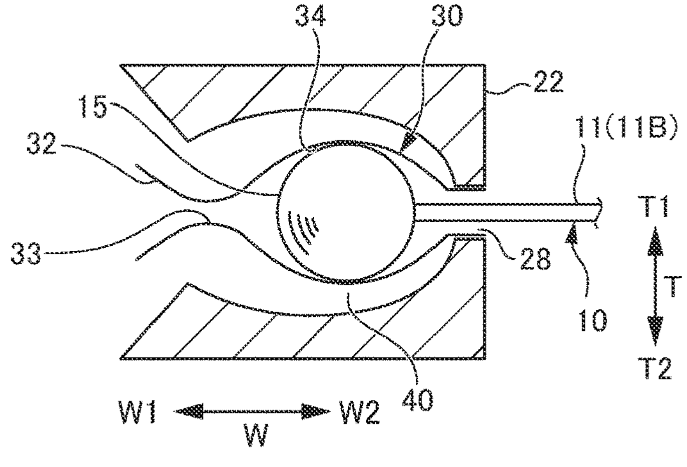
FIG. 10C is a plan view illustrating a third stage of the operation in which the wiring member according to the embodiment of the present disclosure is connected to the electrode part of the connector.

The terminal part 15 is inserted from the opening part 32 towards the engaging part 34 side (the side of the second width direction W2) with respect to the electrode part 30, and engages into the engaging part 34. FIGS. 10A to 10C are transition diagrams illustrating the operation of connecting the terminal part 15 to the electrode part 30. As illustrated in FIGS. 10A to 10B, as the terminal part 15 is inserted from the opening part 32 into the electrode part 30, each leaf spring 31 elastically deforms and opens, and the terminal part 15 passes through the narrow part 33 and enters the engaging part 34, as illustrated in FIG. 10C. As a result, each leaf spring 31 elastically clamps the terminal part 15, and the terminal part 15 is held in a state engaged with the electrode part 30.

On the other hand, the terminal part 15 can be pulled out from the electrode part 30 by a reverse operation. That is, when the terminal part 15 engaged in the engaging part 34 is moved to the entrance/exit 27 side (the side of the first width direction W1), each leaf spring 31 elastically deforms and opens, and the terminal part 15 leaves the narrow part 33 and exits to the outside. In this manner, the terminal part 15 is removably engaged with the electrode part 30.

As illustrated in FIG. 9, a terminal plate 35 is connected to the electrode part 30. The terminal plate 35 is connected to at least one of the leaf springs 31 of the electrode part 30. The terminal plate 35 is pulled out to the outside of the entrance/exit 27 side through the bottom plate part 24 of the connecting part 22. The terminal plate 35 may be integral with or separate from the leaf springs 31. When the connector 20 is mounted on the control device 2, the terminal plate 35 is connected to the terminals of the control device 2. Note that the terminal plate 35 is not illustrated in some of the drawings.

The connection guide part 50 includes a slit 53 provided in the connecting part 22. As illustrated in FIG. 6, the slit 53 extends in the width (W) direction in the center of the length (L) direction of the connecting part 22. As illustrated in FIG. 9, the slit 53 is formed as extending from the top plate part 23 to the back plate part 26 of the connecting part 22. That is, the slit 53 includes a first slit part 51 extending in the width (W) direction and formed in the top plate part 23, and a second slit part 52 extending in the height (T) direction and formed in the back plate part 26. The first slit part 51 and the second slit part 52 are continuous. The first slit part 51 communicates with the housing part 40 and the entrance/exit 27. The second slit part 52 communicates with the housing part 40. As illustrated in FIG. 9, the end part (the lower end part in FIG. 9) of the second slit part 52 configures the pull-out port 28.

The slit 53 has a width larger than the outer diameter of the wire part 11 of the wiring member 10. Therefore, when the straight extended wire part 11 is inserted from the outside of the housing 21 in the downward direction T2 along its radial direction, i.e., along the central direction of the cross section, into the slit 53, a portion of the wire part 11 can be arranged in the housing part 40. When the wire part 11 is inserted into the slit 53 from the state where the terminal part 15 is arranged on the entrance/exit 27 side on the outside of the top plate part 23, as illustrated in FIG. 10A, the terminal part 15 is arranged on the side of the entrance/exit 27, and a portion of the wire part 11 is arranged between the pair of leaf springs 31 in the housing part 40. At this time, the wire part 11 is in a state of being pulled out of the connecting part 22 from the pull-out port 28. As a result, the pull-out part 11B, which is pulled out from the pull-out port 28 of the connecting part 22, is formed in the wire part 11.

Figure 11A:
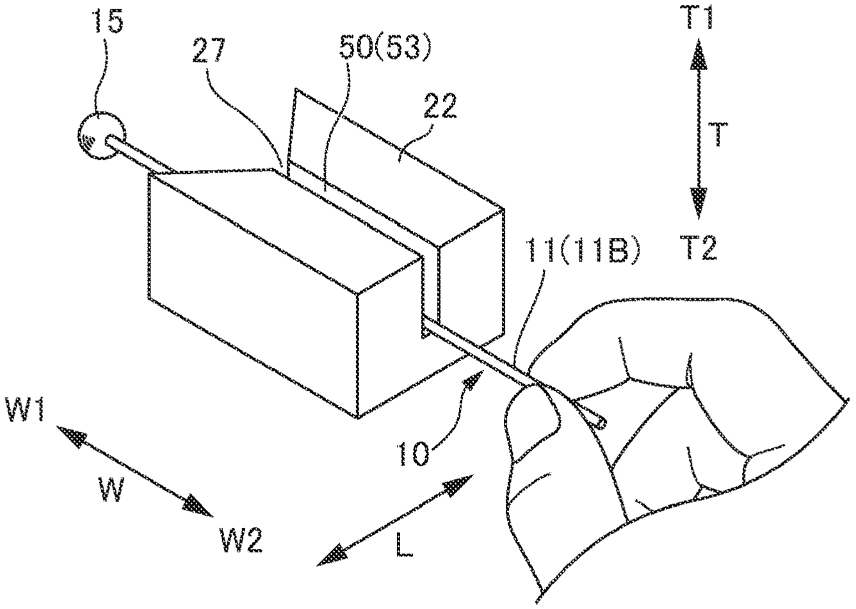
FIG. 11A is a perspective view illustrating a first stage of a procedure for connecting the wiring member according to the embodiment of the present disclosure to the connector.
Figure 11B:
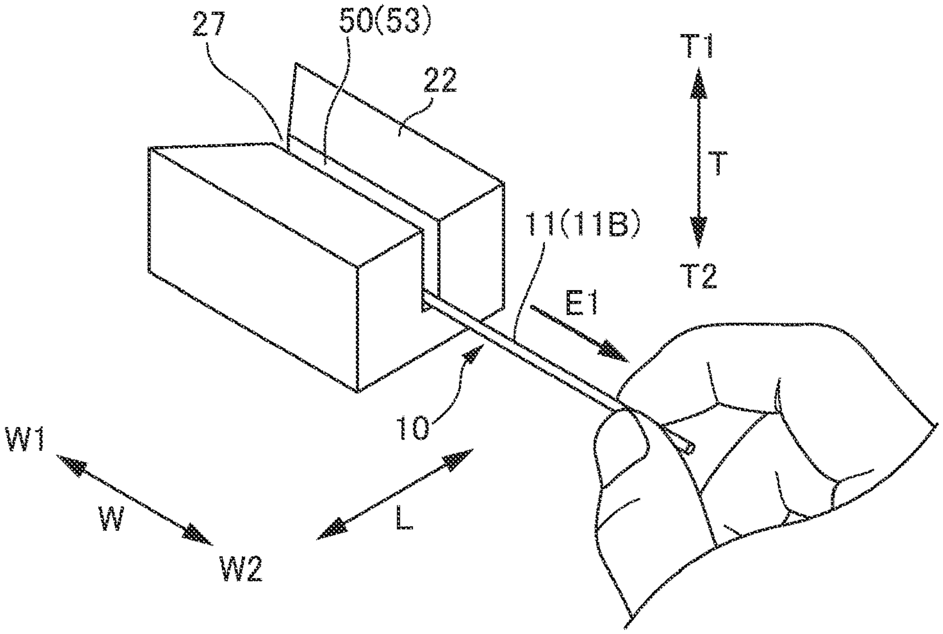
FIG. 11B is a perspective view illustrating a second stage of the procedure for connecting the wiring member according to the embodiment of the present disclosure to the connector.

The connection guide part 50, which includes the slit 53, allows the wiring member 10 to be in the following state with respect to the connecting part 22 of the housing 21. That is, as illustrated in FIGS. 10A and 11A, when the terminal part 15 is arranged on the side of the entrance/exit 27, the wire part 11 is arranged on the side of the pull-out port 28, and the wire part 11 is inserted through the slit 53 to the housing part 40 in the downward direction T2, the pull-out part 11B of the wire part 11 pulled out from the housing 21 is formed. As illustrated in FIG. 11B, from this state, when the pull-out part 11B is pinched with the fingers and pulled in a direction opposite to the terminal part 15 in the extending direction of the wire part 11 (or the direction of the pull-out port 28 indicated by the arrow E1) i.e., in the second width direction W2, the terminal part 15 is introduced from the entrance/exit 27 to the electrode part 30 and engages into the engaging part 34 of the electrode part 30, as illustrated in FIG. 10C. Thus, the wiring member 10 is electrically connected to the connector 20.

Figure 12A:
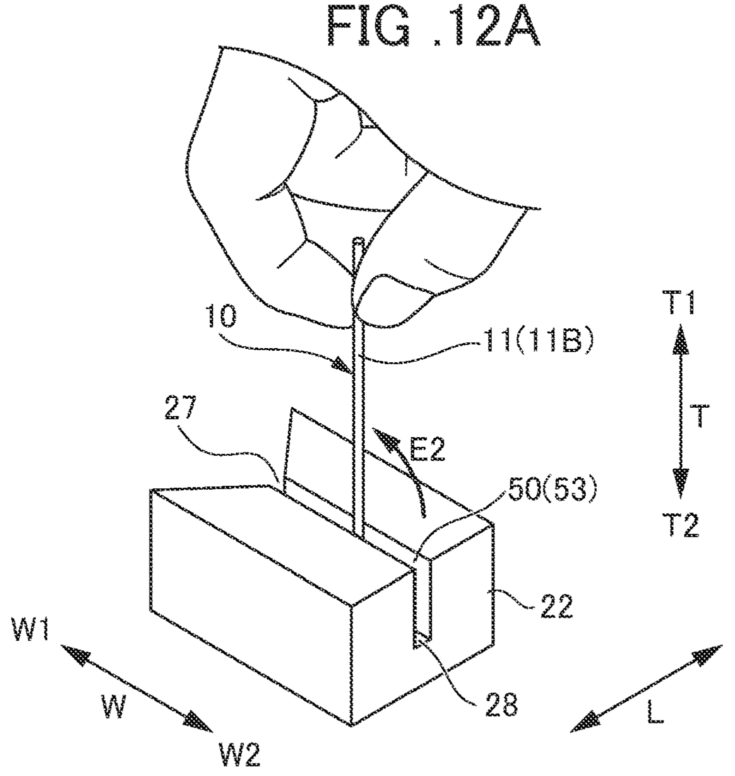
FIG. 12A is a perspective view illustrating a first stage of a procedure for removing the wiring member according to the embodiment of the present disclosure from the connector.
Figure 12B:
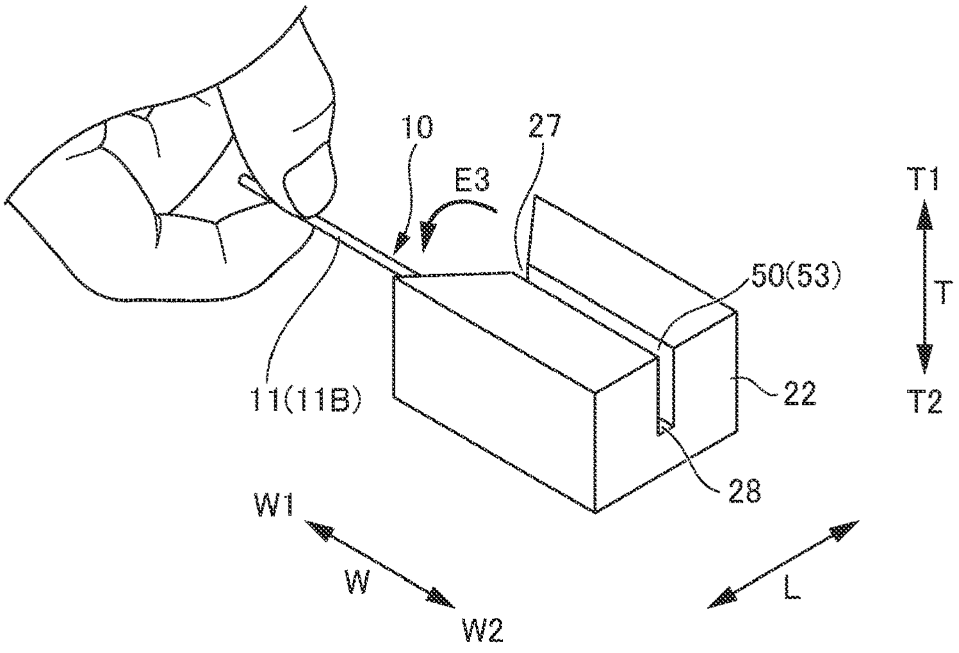
FIG. 12B is a perspective view illustrating a second stage of the procedure for removing the wiring member according to the embodiment of the present disclosure from the connector.
Figure 12C:
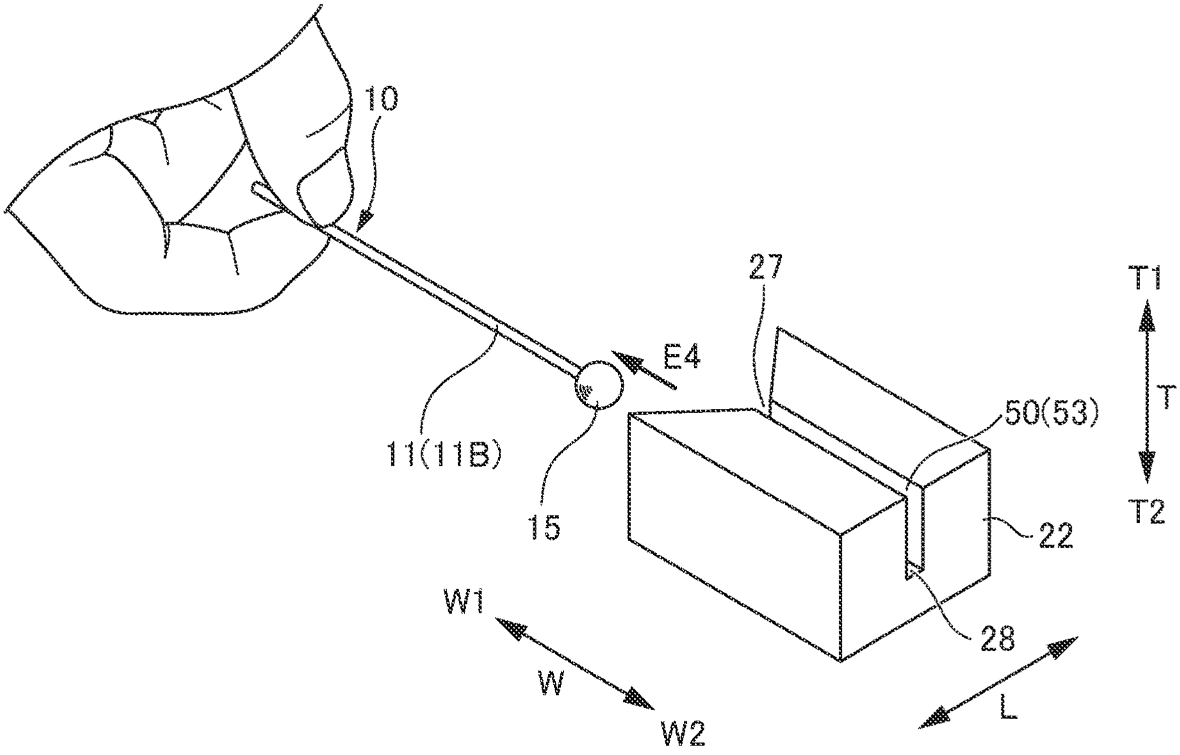
FIG. 12C is a perspective view illustrating a third stage of the procedure for removing the wiring member according to the embodiment of the present disclosure from the connector.

From the connected state described above, as illustrated in FIG. 12A, when the pull-out part 11B is pinched with the fingers, the wiring member 10 allows the wire part 11 to rotate about the terminal part 15 as the center along the slit 53 toward the entrance/exit 27 side (indicated by the arrow E2). As illustrated in FIG. 12B, when the wire part 11 is rotated approximately 1800 (indicated by the arrow E3), the pull-out part 11B is rotated and arranged on the side of the entrance/exit 27. From this state, as illustrated in FIG. 12C, when the pull-out part 11B is pulled to the side of the entrance/exit 27 (the first width direction W1 side) (indicated by the arrow E4), the terminal part 15 exits to the outside of the housing 21. Thus, the wiring member 10 is detached from the connector 20.

According to the embodiment described above, the following effects are achieved. The connector device 1 according to the embodiment includes the wiring member 10 and the connector 20 to which the wiring member 10 is detachably connected; the wiring member 10 has the linear wire part 11 and the terminal part 15 arranged at the tip side of the wire part 11 as an engaged part; the connector 20 has the electrode part 30 with which the terminal part 15 is removably engaged, the housing 21 that includes the housing part 40 that houses the electrode part 30, and the connection guide part 50 provided in the housing 21; the housing 21 includes the entrance/exit 27 for the terminal part 15 to the electrode part 30 housed in the housing part 40, and the pull-out port 28 through which the wire part 11 is pulled out from the housing part 40 to the outside of the housing 21; and the connection guide part 50 allows the terminal part 15 to be arranged on the side of the entrance/exit 27, allows the wire part 11 to be arranged on the side of the extraction pull-out port 28, allows the pull-out part 11B of the wire part 11 to be formed in a state of being pulled out from the housing 21, and allows the terminal part 15 to be introduced and engaged from the entrance/exit 27 to the electrode part 30 by pulling the pull-out part 11B in a direction opposite to the terminal part 15.

According to the embodiment, instead of pinching the wire part 11 and squeezing the terminal part 15 into the electrode part 30, the wiring member 10 can be connected to the connector 20 by pulling the wire part 11. Therefore, even if the wire part 11 is flexible without rigidity, the wiring member 10 can be easily connected to the connector 20, which can improve the workability.

With the connector device 1 according to the embodiment, the connection guide part 50 includes the slit 53, which allows the wire part 11 to be inserted from the outside to the housing part 40 along the central direction of the cross section of the wire part 11, allows the terminal part 15 to be arranged on the side of the entrance/exit 27, and allows the pull-out part 11B to be pulled out from the pull-out port 28 to the outside of the housing 21.

As a result, by providing the slit 53, the connection guide part 50 can be easily configured, and the configuration of the connector 20 can be simplified.

With the connector device 1 according to the embodiment, in a state where the terminal part 15 is engaged with the electrode part 30, the wire part 11 is rotated about the terminal part 15 as the center, along the slit 53, whereby the pull-out part 11B is arranged on the side of the entrance/exit 27.

Thus, the wire part 11 is rotated along the slit 53, the pull-out part 11B is arranged on the side of the entrance/exit 27, and the wire part 11 is pulled in this state, whereby the wiring member 10 can be removed from the connector 20. Therefore, the wiring member 10 can be easily and reliably connected to or disconnected from the connector 20 without using a tool.

In the connector device 1 according to the embodiment, the electrode part 30 preferably includes the pair of leaf springs 31 as spring electrodes with which the terminal part 15 elastically engages.

Thus, the terminal part 15 can be easily inserted to and removed from the electrode part 30, in which the connected state is reliably maintained.

In the connector device 1 according to the embodiment, the inner surface of the entrance/exit 27 is preferably formed in a taper shape in which the cross-sectional opening area widens as distancing away from the housing part 40.

Thus, the terminal part 15 of the wiring member 10 can be smoothly introduced into the electrode part 30 in the housing part 40, which further improves the workability.

Next, a modified example will be described with reference to FIGS. 13 to 15, in which the embodiment is partly modified. This modified example is different from the above embodiment in a portion of the connector 20, and the other configurations are the same. Therefore, the same reference numerals assigned to the configurations common with the embodiment, for which the description is omitted, and mainly the differences are described.

Figure 13:
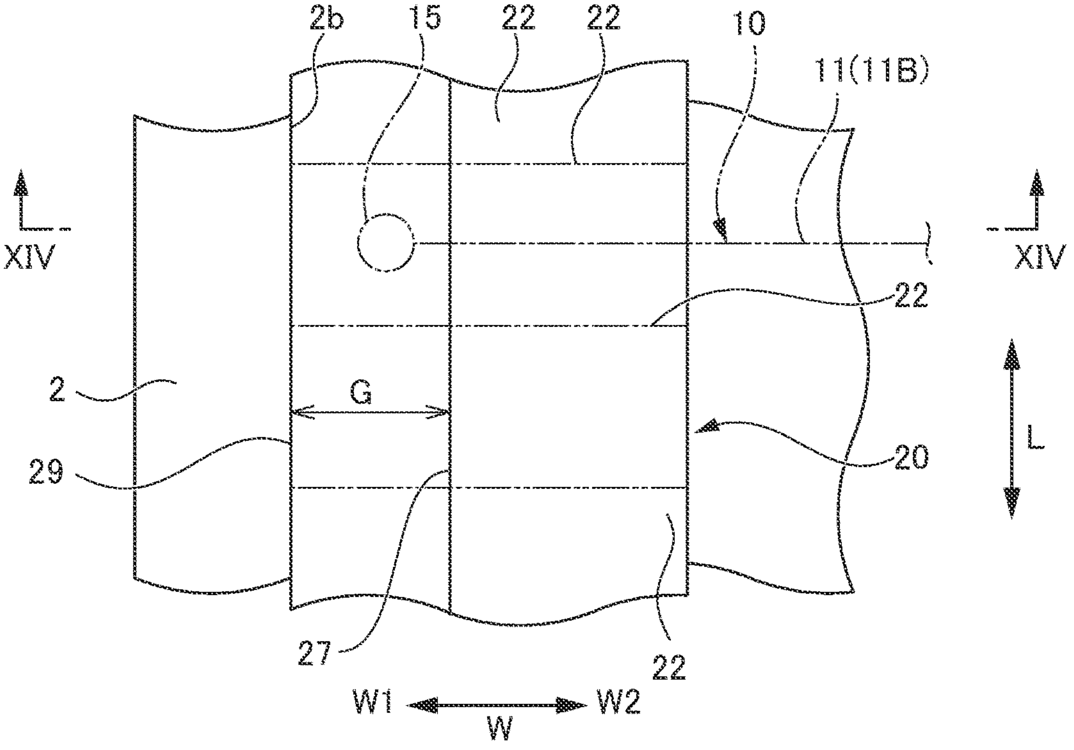
FIG. 13 is a plan view illustrating a portion of a connector in a modified example based on the embodiment of the present disclosure.
Figure 14:
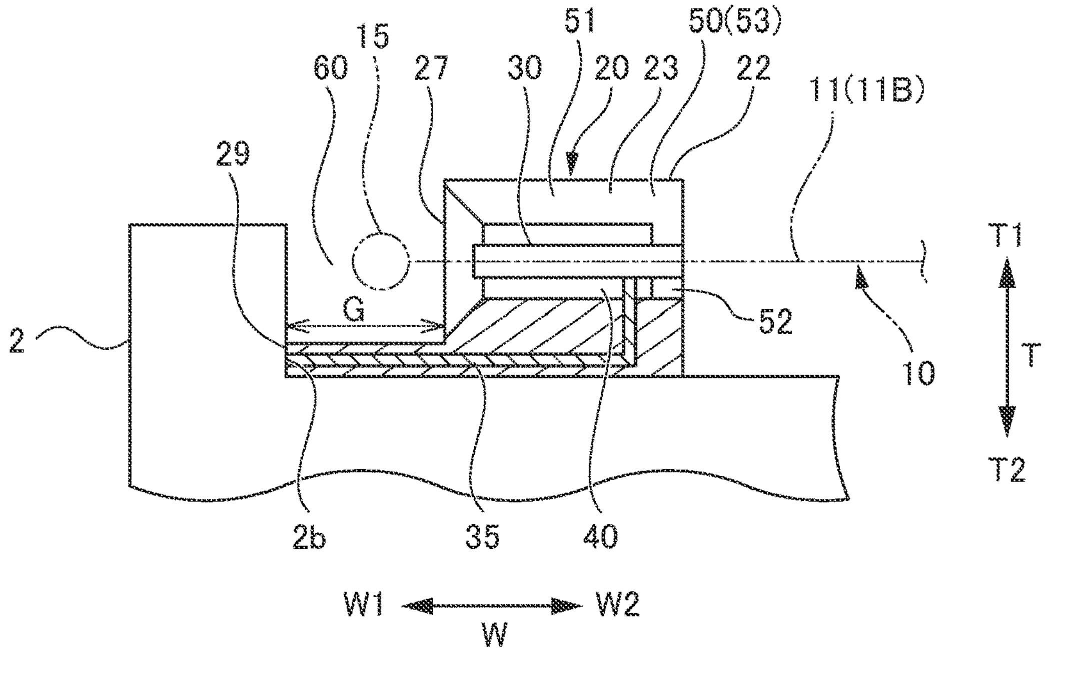
FIG. 14 is a sectional view taken along the line XIV-XIV in FIG. 13.

FIG. 13 is a plan view illustrating a portion of the connector 20 of the modified example, which is mounted on the control device 2. FIG. 14 is a cross-sectional view along the line XIV-XIV in FIG. 13.

Figure 15:
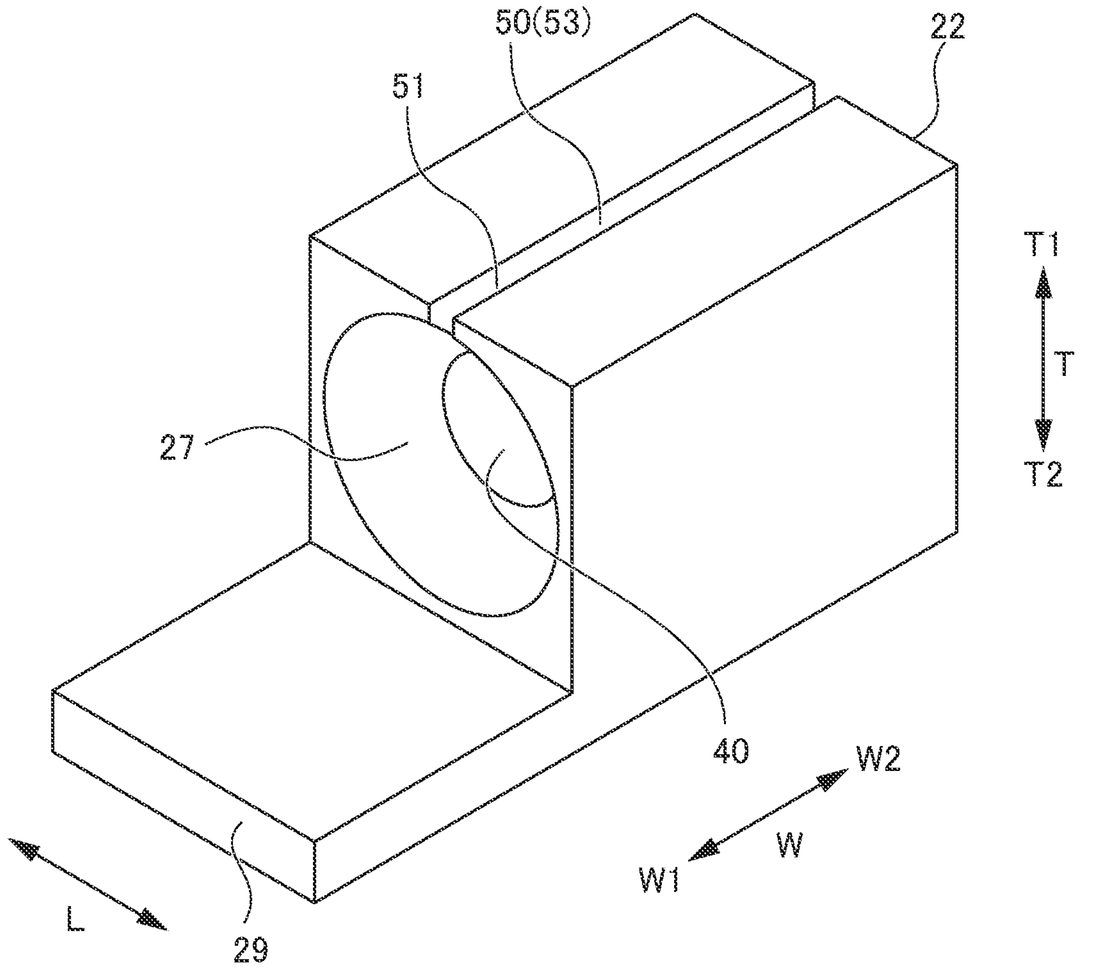
FIG. 15 is a perspective view of a connecting part configuring a portion of the connector according to the modified example.

FIG. 15 is a perspective view of the connecting part 22 viewed from the entrance/exit 27 side.

The housing 21 of the connector 20 has a joining surface 29 joined to a mounting surface 2*b* included in the control device 2. The notch part 22*a* is not formed on the entrance/exit 27 side of the connecting part 22. The entrance/exit 27 is spaced a distance G in the width (W) direction from the joining surface 29, and a space 60 corresponding to the distance G is opened between the entrance/exit 27 and the mounting surface 2*b* of the control device 2. This space 60 has a size in which the terminal part 15 of the wiring member 10 can be arranged. As illustrated in FIG. 15, the entrance/exit 27 of the connecting part 22 is formed in a conical taper shape in which the cross-sectional opening area widens as distancing away from the housing part 40 toward the first width direction W1 side.

In this modified example, the wire part 11 is inserted into the slit 53, the terminal part 15 is arranged in the space 60, and the pull-out part 11B is pulled out from the pull-out port 28 to the outside. From this state, the pull-out part 11B is pulled such that the terminal part 15 engages with the electrode part 30, and the wiring member 10 is connected to the connector 20. From this connected state, when the wire part 11 is rotated about the terminal part 15 as the center along the slit 53 to the entrance/exit 27 side, and the pull-out part 11B is pulled to the side of the entrance/exit 27, the terminal part 15 exits from the housing 21 to the space 60. As a result, the wiring member 10 can be removed from the connector 20.

In the modified example, the connector 20 is detachably mounted on the control device 2, and the space 60, in which the terminal part 15 can be arranged, is provided between the entrance/exit 27 of the connecting part 22 of the housing 21 and the control device 2.

As a result, even in the state where the connector 20 is mounted on the control device 2, the wiring member 10 can be connected to or disconnected from the connector 20.

Figure 16:
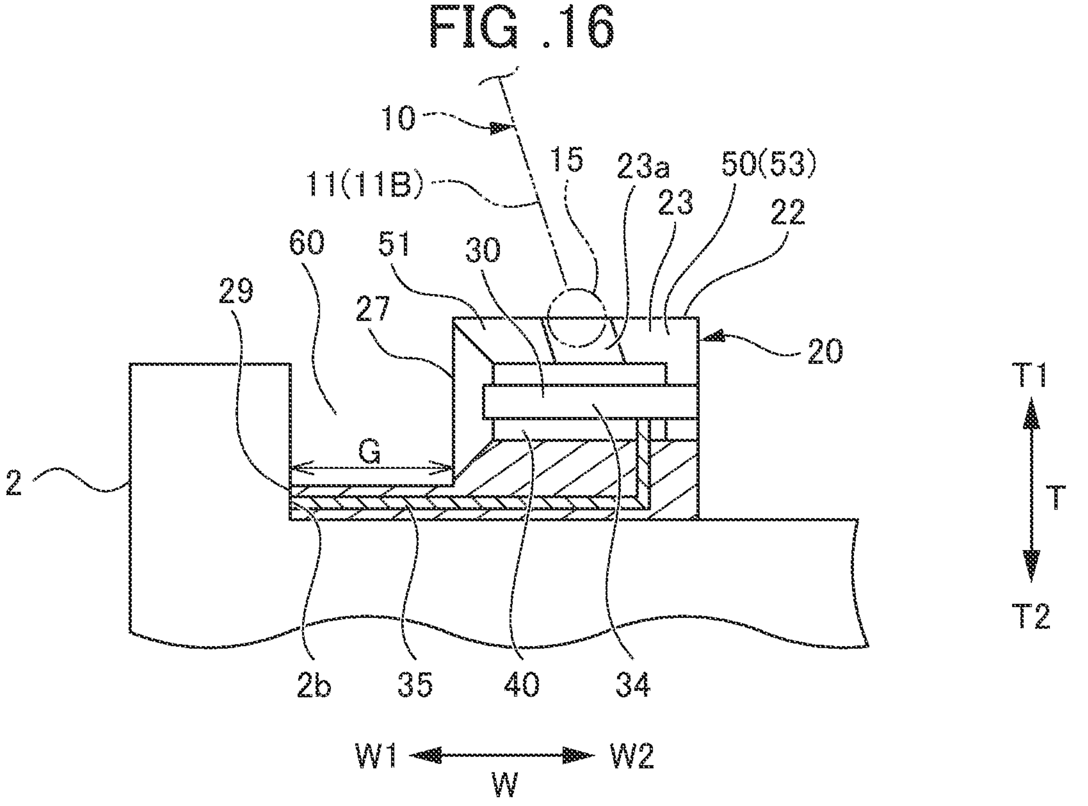
FIG. 16 is a side sectional view illustrating a case where a terminal extraction hole of a terminal part is provided in the connector according to the modified example.
Figure 17:
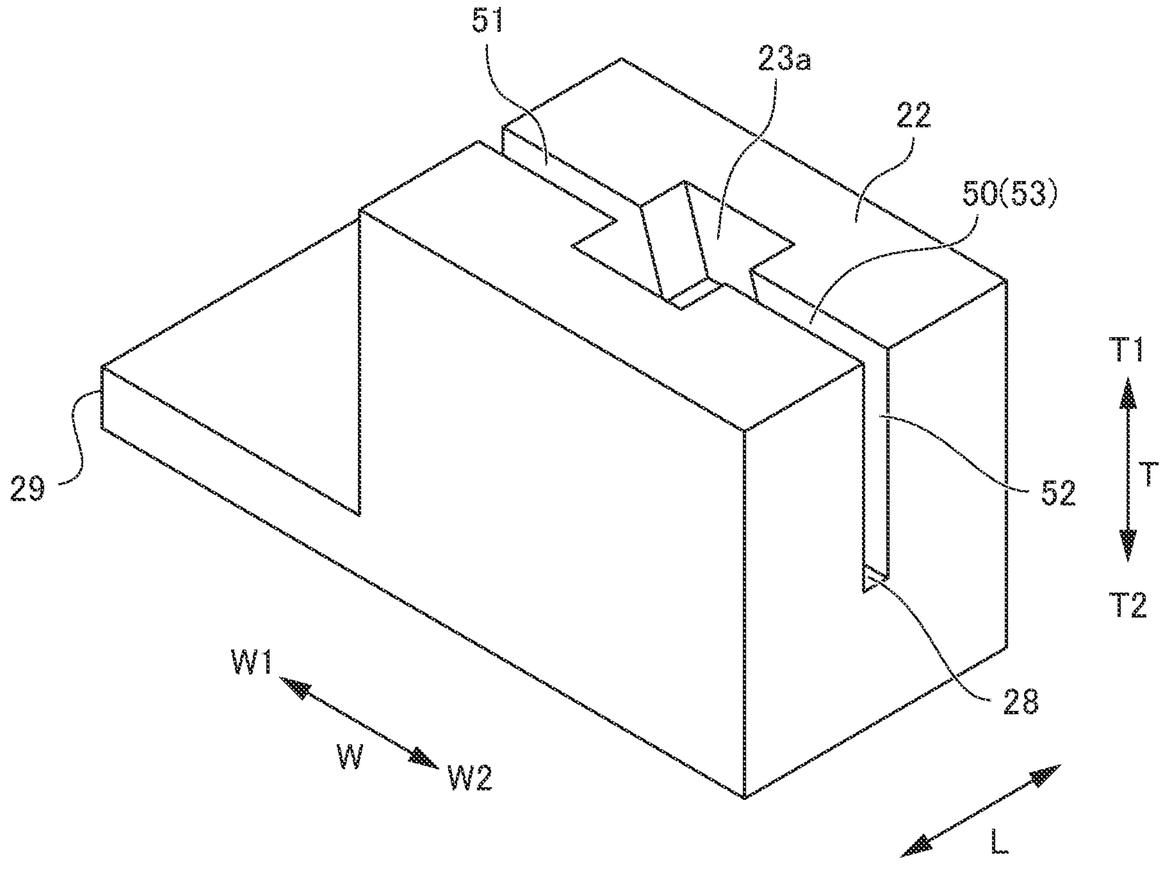
FIG. 17 is a perspective view of the connecting part configuring a portion of the connector illustrated in FIG. 16.

In the connector 20 of the modified example, as illustrated in FIGS. 16 and 17, the housing 21 may be configured to include an extraction hole 23*a* on the side of the top plate part 23 (the side of the upward direction T1). The extraction hole 23*a* is arranged at a position corresponding to the electrode part 30 on the top plate part 23, i.e., at a position directly above the engaging part 34 in the electrode part 30 in FIG. 16. The extraction hole 23*a* has a size that allows the terminal part 15 to pass through.

After the pull-out part 11B of the wiring member 10 connected to the connector 20 is pinched with the fingers, at a midway position of rotating the wire part 11 around the terminal part 15 to the pull-out part 11B side, the wire part 11 is rotated approximately 90 degrees, then the wire part 11 is passed through the extraction hole 23*a* and pulled out to the outside of the top plate part 23. From this state, when the wire part 11 is pulled in the direction opposite to the terminal part 15, the terminal part 15 is pulled out through the extraction hole 23*a* to the outside of the housing 21. As a result, the wiring member 10 can be removed from the connector 20. The outside of the top plate part 23, in which the extraction hole 23*a* is arranged, is a wide space; therefore, the wire part 11 can be easily pulled, and the wiring member 10 can be easily removed from the connector 20.

Thus, in the present disclosure, the housing 21 may have the extraction hole 23*a* that allows the terminal part 15 to be pulled out to the outside of the housing 21 at a midway position of rotating the wire part 11 from the pull-out port 28 side to the entrance/exit 27 side.

As a result, the wiring member 10 can be removed from the connector 20 not only in the direction of the entrance/exit 27 but also in the direction of the extraction hole 23*a*; therefore, the wiring member 10 can be easily removed from the connector 20 in the state where the connector 20 is mounted on the control device 2.

The present disclosure is not limited to the above embodiments and can be modified as appropriate.

For example, the connection guide part 50 is not limited to the slit 53, as long as an aspect of present disclosure allows the terminal part 15 of the wiring member 10 to be arranged on the side of the entrance/exit 27, allows the wire part 11 to be arranged on the side of the pull-out port 28, and allows the terminal part 15 to engage with the electrode part 30 by pulling the pull-out part 11B in the direction opposite to the terminal part 15. The opposite direction described in the embodiment is the direction in which the wire part 11 extends, and approximately 180 degrees the opposite side with respect to the terminal part 15; however, the direction is not limited to approximately 180 degrees, and may be any direction in which the terminal part 15 engages with the electrode part 30. The terminal part, which is the engaged part arranged on the tip side of the wire part 11, does not have to be a nodular terminal part 15 larger than the outer diameter of the wire part 11 as in the embodiment, and may be in any aspect as long as removably engaging with the electrode part.

EXPLANATION OF REFERENCE NUMERALS

1: connector device
2: control device (device)
10: wiring member
11: wire part
11*b*: pull-out part
15: terminal part
20: connector
21: housing
23*a*: extraction hole
27: entrance/exit
28: pull-out port
30: electrode part
31: leaf spring (spring electrode)
40: housing part
50: connection guide part
53: slit
60: space

The invention claimed is:

1. A connector device, comprising:
a wiring member; and
a connector detachably connected to the wiring member, the wiring member including:
a linear wire part; and
a terminal part as an engaged part arranged at a tip end of the wire part, the connector including:
an electrode part, with which the terminal part is removably engaged;
a housing including a housing part that houses the electrode part; and
a connection guide part provided in the housing,
the housing including: an entrance/exit for the terminal part to the electrode part housed in the housing part; and a pull-out port, through which the wire part is pulled out from the housing part to an outside of the housing, and
the connection guide part allowing the terminal part to be arranged on a side of the entrance/exit, allowing the wire part to be arranged on a side of the pull-out port, allowing a pull-out part of the wire part to exist in a state of extending from the housing, and allowing the terminal part to be introduced and engaged from the entrance/exit to the electrode part by pulling the pull-out part in a direction opposite to the terminal part.

2. The connector device according to claim 1,
wherein the connection guide part includes a slit, and
wherein the slit allows the wire part to be inserted from the outside into the housing part along a central direction of a cross section of the wire part, allows the terminal part to be arranged on a side of the entrance/exit, and allows the pull-out part to be in a state of having been pulled out from the pull-out port to the outside of the housing.

3. The connector device according to claim 2, wherein, in a state where the terminal part is engaged with the electrode part and the wire part has been rotated about the terminal part as the center, along the slit, the pull-out part is arranged on a side of the entrance/exit.

4. The connector device according to claim 3, wherein the housing includes an extraction hole that allows the terminal part to be pulled out to the outside of the housing at a midway position of rotating the wire part from a side of the pull-out port to a side of the entrance/exit.

5. The connector device according to claim 1, wherein the electrode part includes a spring electrode, with which the terminal part elastically engages.

6. The connector device according to claim 1, wherein an inner surface of the entrance/exit is formed in a taper shape with a cross-sectional opening area that widens as distancing away from the housing part.

7. The connector device according to claim 1,
wherein the connector is detachably attached to a predetermined device, and wherein a space, in which the terminal part can be arranged, is provided between the entrance/exit of the housing and the device.

* * * * *